Aug. 28, 1945.　　　G. J. LOVERS ET AL　　　2,383,607
PIPE CUTTING MACHINE
Filed June 6, 1942　　　3 Sheets-Sheet 1

INVENTORS
Guy Joseph Lovers
Thomas Karan
BY
ATTORNEYS

Aug. 28, 1945.  G. J. LOVERS ET AL  2,383,607
PIPE CUTTING MACHINE
Filed June 6, 1942  3 Sheets-Sheet 2
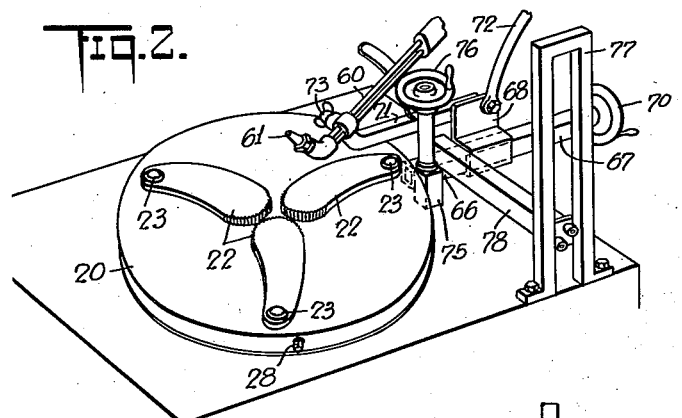
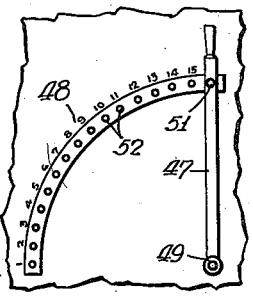
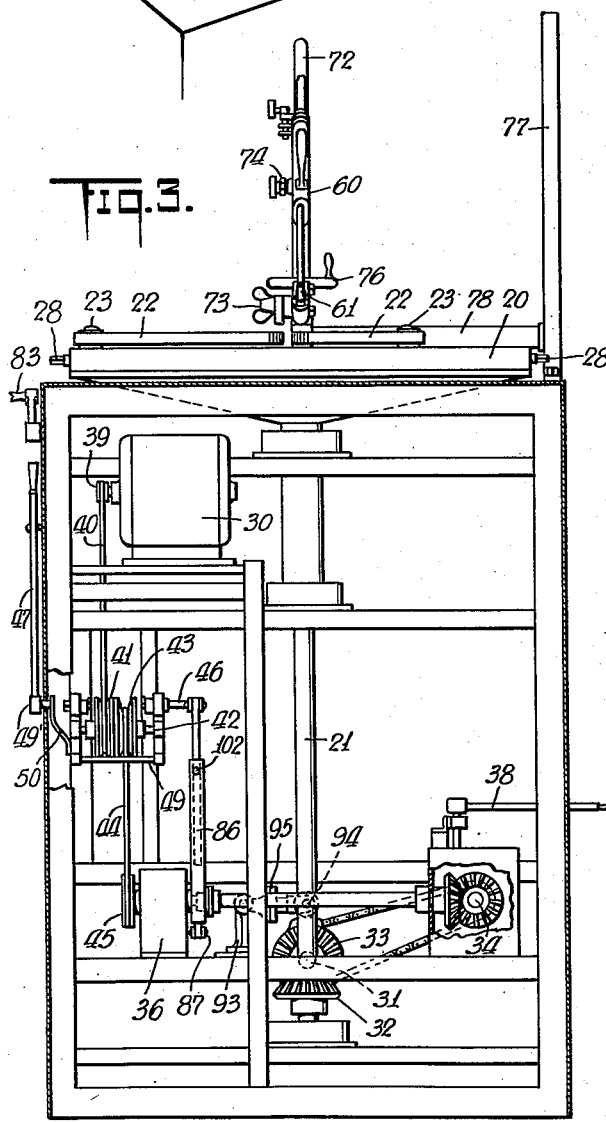
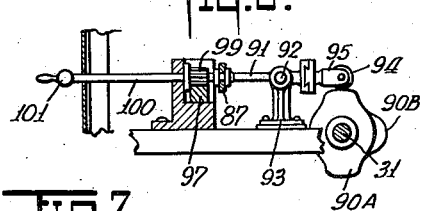
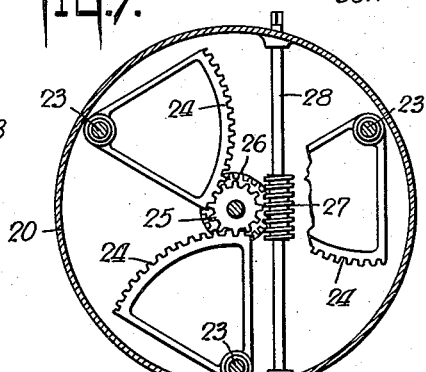
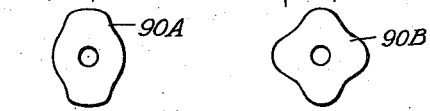
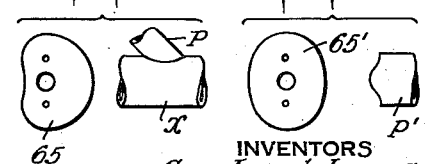
INVENTORS
Guy Joseph Lovers
Thomas Karan
BY
ATTORNEYS Aug. 28, 1945.  G. J. LOVERS ET AL  2,383,607
PIPE CUTTING MACHINE
Filed June 6, 1942  3 Sheets-Sheet 3
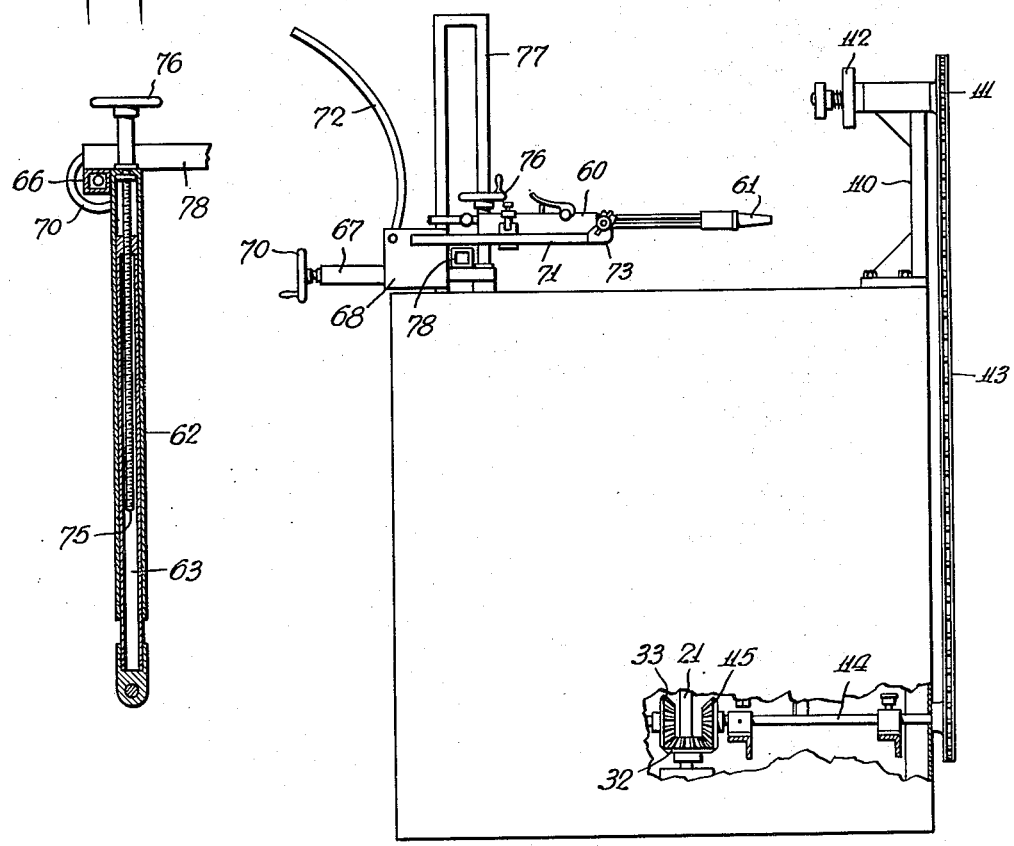
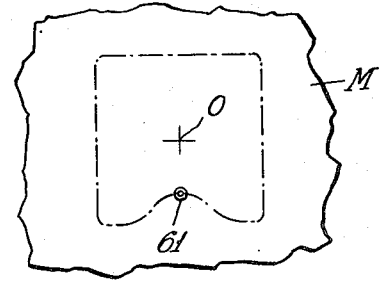
INVENTORS
Guy Joseph Lovers
Thomas Karan
BY
ATTORNEYS Patented Aug. 28, 1945

2,383,607

UNITED STATES PATENT OFFICE 2,383,607

PIPE-CUTTING MACHINE

Guy Joseph Lovers, Astoria, and Thomas Karan, Elmhurst, N. Y.

Application June 6, 1942, Serial No. 446,142

17 Claims. (Cl. 266—23)

This invention relates to the cutting of metal articles along a predetermined cyclic path during a relative rotation of the torch and article about an axis circumscribed by said path. As an example it relates to the cutting of the end of a pipe to a contour which will correspond to that of an aperture at which the pipe is to be connected. Obviously, if the pipe is to be welded to a flat plate and in a position at right angles to the plane of the plate, the end of the pipe should be at right angles to the axis thereof. If it is to be welded to a flat plate at an acute angle to the plate or is to be welded to the end of another pipe of the same diameter, but with the pipe sections at an angle to each other, the end of each pipe section should be cut in a plane at the proper angle to the axis. Where the end of a pipe is to be welded at an aperture in the side of another pipe of the same or larger diameter or at an aperture in any other curved wall or plate, the end must be cut along a curved line which will be determined from certain factors including the relative radii of the pipe and the curved wall to which it is to be secured and the angle at which the pipe is to extend.

It has been proposed to employ a torch to effect the cutting, to slowly rotate the pipe during the cutting and to move the torch back and forth in the direction of the length of the pipe and to the proper extent to give the desired curvature of the line along which the cut is to be made.

The present invention involves an apparatus for use in cutting pipe ends or other metal articles for the purposes above referred to and for other purposes. and the invention has for one of its objects the more effective holding and centering of the pipe to be cut, and the forming of a more uniform cut regardless of the particular curvature of the line of the cut.

To obtain a uniform cut, the rate of travel of the torch along the line should be uniform and is determined by the character and thickness of the metal being cut and the size of the torch tip employed.

Our invention may be employed in an apparatus in which the pipe is rotated and the torch moved back and forth in an axial direction, or the pipe is rotated and moved back and forth in an axial direction in respect to a stationary torch, or the pipe is stationary and the torch is moved around the pipe and back and forth, or the pipe is moved back and forth axially but without rotation, and the torch moved around the pipe in a single plane. These and other combinations of movement are contemplated by the statement that the pipe and torch are relatively rotatable, and relatively moved back and forth in a direction parallel to the axis of the pipe.

As an important feature of our invention, we provide means whereby the rate of cutting along the line is maintained substantially constant. This is accomplished by automatically varying the rate of relative movement of the pipe wall and the torch circumferentially of the pipe, in accordance with the pitch of the particular portion of the line being cut; in other words, in accordance with the relative values of the circumferential and axial components of the curve. The relative circumferential movement of the pipe wall and the torch is the greatest when the axial component of the line to be cut is zero and will decrease as the circumferential component of the line decreases. For instance, along the portion of a line to be cut, which is at 45° to an axial element of the surface, the rate of relative circumferential travel of the pipe wall and torch is reduced to about two-thirds of the rate of travel along a portion of the line of cut extending in a plane at right angles to the axis of the pipe. Likewise, where the line of cut is at 60° to the axial element, the rate of travel in a circumferential direction is reduced to about one-half.

In carrying out our invention, we may employ various means for varying the relative circumferential movement in respect to the relative rate of axial movement or vice versa. Merely as one of many forms in which the invention may be carried out, we provide a cam which is selected or designed in accordance with the type of curved line to be cut, and employ said cam to progressively increase and decrease the rate of relative circumferential movement of the torch and pipe in accordance with the varying pitch of the curved line to be cut. The cam may be so connected in the operating mechanism that it makes one complete revolution for each complete relative rotation of the pipe and torch. Depending upon the character of the curve, the cam may be designed and connected so that it makes one-half or other simple fraction of a rotation or two or any simple number of rotations for each complete cut around the circumference of the pipe. The relative axial movement of the pipe and torch may be effected in various ways, as for instance, by a suitable cam.

In a preferred embodiment of the invention, the pipe is held against axial movement and means are provided for rotating it at a variable rate while the torch moves back and forth in a straight line parallel to the axis of the pipe. Where a cam is used to vary the relative rate of circumferential movement of the pipe and torch, it may control any suitable speed varying mechanism. Merely as one example of such a mechanism, we may employ a Reeves drive in which the relative effective diameters of the V pulleys are progressively changed by the movement of the cam or other controlling device.

The invention may be employed for cutting pipe, extending in a horizontal direction or in a vertical direction, or it may be so mounted that it may be tilted to the proper position in accordance with the position of the pipe to be cut, particularly if the latter be a long one.

As a further important feature we provide a simple and easily operated mechanism which will automatically center the pipe regardless of the diameter of the pipe and which will positively grip and hold the pipe during the cutting operation.

As a further important feature we provide improved mechanism whereby the rate of relative rotation of the torch and pipe may be varied, dependent upon the diameter of the pipe and the corresponding length of the cut to be made during a complete revolution.

As a further important feature we provide simple means whereby the angle of the torch tip in respect to the axis of the pipe may be varied to give a cut of any desired bevel.

As a further important feature we provide means whereby different curvatures may be given to the line of cut, dependent upon the nature and character of the surface to which the cut end of the pipe is to be attached.

As a further important feature we provide means whereby a metal plate or disc may be cut from a plate mounted to rotate about an axis at right angles to the plane of the plate and circumscribed by the cut defining the periphery of the disc.

Various other features will be hereinafter referred to or will be apparent from an inspection of the accompanying drawings in which merely one embodiment of our invention is illustrated, but as above noted, various changes may be made within the scope of the invention, as defined in the appended claims.

Fig. 2 is a perspective view of the upper portion of the machine showing the torch and pipe supports.

Fig. 3 is a side elevation of the machine looking from the right of Fig. 1; certain parts being in section and certain parts being broken away.

Fig. 5 is a side elevation of a portion of the machine looking from the left side of Fig. 3.

Fig. 6 is a vertical section on the line 6—6 of Fig. 4.

Fig. 7 is a horizontal section on the line 7—7 of Fig. 1.

Figs. 8 and 9 are face views of cams which may be employed for effecting variation in speed during the relative rotation of the pipe and torch.

Figs. 10 and 11 show further shapes of cams with the side views of pipe sections to be cut by the use of such cams.

Fig. 12 is a section on the line 12—12 of Fig. 1.

Fig. 13 is a side elevation of the machine shown in Fig. 1 but with an attachment for cutting plates, and Fig. 14 is a view of a portion of a plate indicating a cut which may be made of the attachment shown in Fig. 13.

Figure 1:
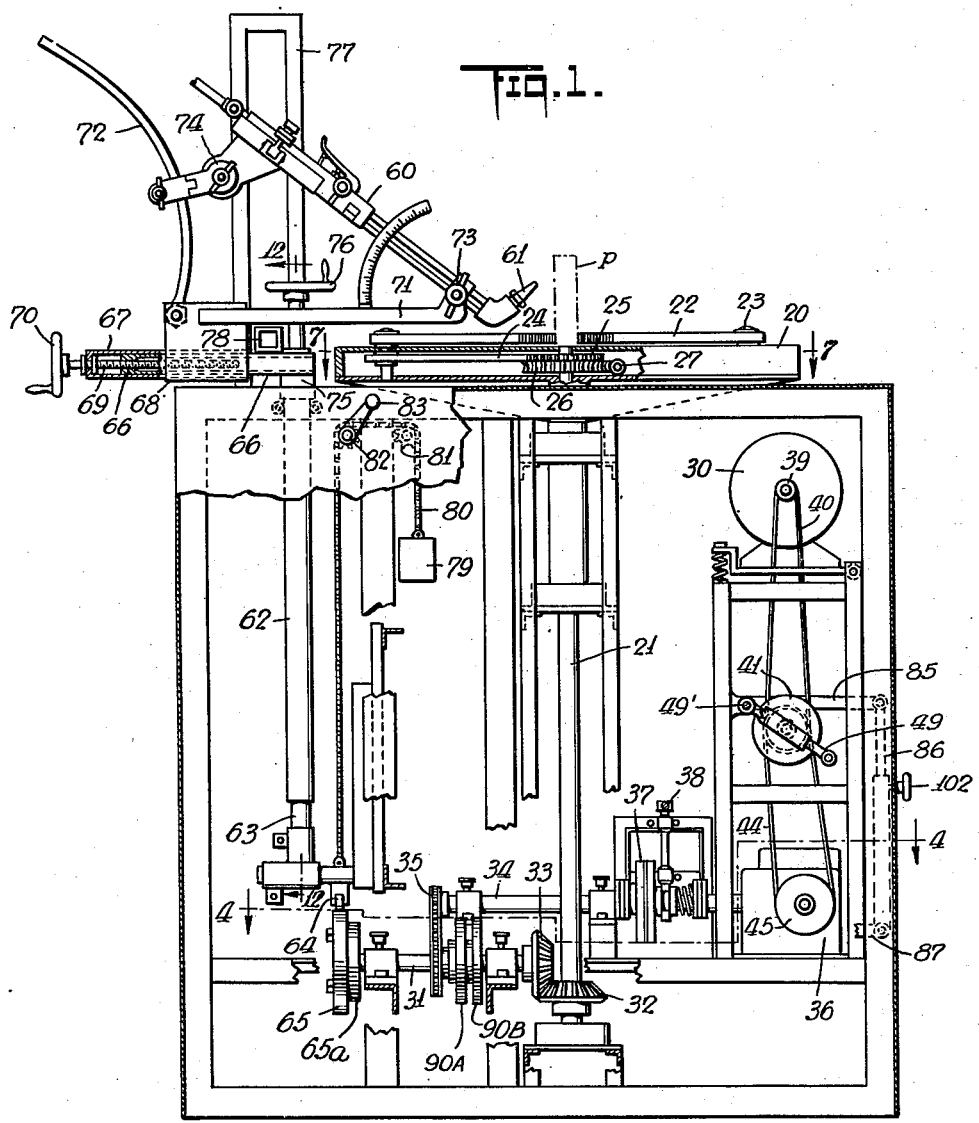
Fig. 1 is a side elevation of a machine embodying the invention; certain of the parts being shown in section or broken away.

In the specific form shown in the drawings, the pipe P is supported in a vertical position on a table 20 mounted to rotate in a horizontal plane and connected to and driven by a vertical drive shaft 21. The pipe P is shown as resting on the table but the shaft 21 may be of very much larger size than shown, and the pipe P may telescope down into the hollow shaft.

The table is provided with means for centering and gripping the pipe; such means including three grippers 22, shown particularly in Fig. 2 and pivoted to swing on the upper surface of the table and from pivotal points adjacent to the periphery of the table and spaced 120° apart. Each of these grippers has a knurled or roughened end portion and they are connected for simultaneous and equal movement so that when they are in approximately radially extending positions, as shown in Fig. 2, they will grip and center a pipe of the smallest diameter to be cut, but may be moved to such position as to grip and center a pipe of any desired diameter.

Each gripper is secured to a pivot pin 23 which extends down through the top surface of the table and each pin at its lower end is secured to a segment gear 24. These gears all mesh with a pinion 25 which is secured to a worm wheel 26 meshing with a worm 27 on a horizontal shaft 28. The end of the shaft extends beyond the periphery of the table and may have its terminal portion square or of other desired form so that a crank handle may be readily attached and the shaft rotated in the proper direction to swing the segment gears and the grippers into and out of operative position.

For rotating the table at the proper speed, there is provided an electric motor 30 or other suitable constant speed prime mover and operating connections between this prime mover and the shaft 21. In the construction illustrated, the shaft 21 is connected to a shaft 31 by a pair of bevel gears 32, 33 and the shaft 31 is connected to a parallel shaft 34 by gears or a chain and sprockets 35. The shaft 34 is connected to a speed reduction gearing 36 through a clutch 37. The speed reduction gearing may be of any well known type and the details, therefore, have not been illustrated and the clutch likewise may be of any suitable type and provided with some form of operating member 38 for permitting the stopping and starting, at will, of the rotation of the table 20 and the pipe.

The speed reduction gearing is connected to the prime mover 30 and by a speed reducer which is of the type which permits easy and accurate adjustment of the driving ratio. This is preferably of the Reeves type and is preferably formed of two units. As illustrated, the prime mover 30 has a pulley 39 connected by a belt 40 to a second pulley 41. On the shaft 42 of the last mentioned pulley, there is a pulley 43 connected by a belt 44 to a pulley 45 on the input end of the speed reducing gear box 36. The shaft 42 of the pulleys 41 and 43 is mounted on a frame 49 swingable about a pivot 46, so that the pulleys 41 and 43 may be raised or lowered. These pulleys, and preferably also the pulleys 39 and 45 are of the split V type, so that the opposed sections of each pulley may move toward or from each other and the effective diameter altered and the driving ratio correspondingly changed. By swinging the frame 49 upwardly from the position shown in Fig. 1, the sides of the pulley 41 will come together and the sides of the pulley 43 will spread apart and the driving ratio will be altered. In commercial construction, the parts may be so proportioned and so designed that when the frame is swung to its uppermost position, the driving ratio between the prime mover and the pulley 45 will be 1 to 1, and when the bracket is in its lowermost position the pulley 45 will be driven at only a small fraction of the speed of the prime mover. Obviously, various other types of variable speed transmission may be employed between the prime mover 30 and the shaft 34.

For varying the driving ratio, there is provided a lever 47 on the exterior of the casing of the machine and movable over an arcuate scale 48 which indicates the speed ratio to be secured. This lever is mounted on a pivot 49' coaxial with the pivot 46 and has an extension 50 secured to the frame 49. Thus by moving the lever 47 to the proper position, the desired driving speed ratio is obtained. The lever 47 may be locked in position in any suitable manner, as for instance by means of a pin 51 which may enter any one of a series of perforations 52 along the scale 48. The driving speed ratio to be used is dependent upon the diameter as well as the thickness of the pipe wall and the size of the torch tip employed. As previously indicated, for a given size of tip and a given wall thickness, there will be a corresponding rate at which the tip and wall should relatively move to make the proper cut. As a large pipe has a larger circumference than a small one, the length of the cut to be made during a single complete rotation will vary with the diameter of the pipe and the speed of rotation should be such that the rate of cut will be proper for each size of pipe. The scale 48 may be calibrated in pipe diameters and take into consideration the normal variation in wall thicknesses for such varying sizes of pipes. For pipes of a given diameter but abnormally thin or thick walls, proper compensation may be made by proper adjustment of the position of the lever 47.

The control of the adjustment above referred to takes into consideration only the variation in pipe sizes and wall thicknesses. In order to obtain the proper uniform cut where the pitch of the cut varies, further compensation must be made and in carrying out our invention, this is accomplished automatically. This feature of the invention will be set forth more fully after describing the mounting and operation of the cutting torch.

As heretofore set forth, either the pipe may be rotated in respect to the torch or the torch may be moved around the pipe. In the present construction the torch is moved back and forth in a direction parallel to the axis of the pipe during the rotation of the pipe. For effecting the cutting, any suitable type of cutting torch 60 may be employed. It is not intended by the illustration in the drawings to indicate any particular make or type. The torch is so held that the torch tip 61 is directed toward the pipe and at the desired angle in respect to the axis of the pipe so as to form a bevel cut of the desired angle. The torch is carried by a bar or other frame member 62 which is movable back and forth in a direction parallel to the axis of the pipe. For effecting such back and forth movement, the bar 62 is in the form of a sleeve, hollow and non-circular in cross-section and vertically slidable and adjustable on an inner bar 63 provided at its lower end with a bracket carrying a roller 64, resting upon the surface of a cam 65 mounted on the shaft 31 hereinbefore referred to. With the gears 32, 33 of the same pitch diameter, the cam 65 will make one complete revolution for each complete revolution of the pipe supporting table 20. The cam 65 has its cam surface properly designed in respect to the curvature of the cut to be made. The cam is removable and a plurality of these cams may be provided, and of different shapes, in order to adapt the machine to all of the normal kinds of cuts which may be required. In Fig. 10 there is shown the cam 65 for cutting the end surface of the pipe P so as to properly fit an aperture in the wall of a pipe, where the axes of the pipes are at an angle to each other. In Fig. 11 there is shown a cam 65' for cutting the end of a pipe P', where that pipe is to be connected to another pipe and with the axes of the two pipes at right angles to each other. Where no raising or lowering of the torch is required, a cam having a cylindrical surface may be used or the cylindrical plate 65a to which the cam is attached may be moved into operative position beneath the roller 64, or the bar 62 may be raised and locked in raised position above the cam and out of contact with it.

The torch is so connected to the bar 62 that it may be adjusted in a direction radially of the pipe to facilitate the use of pipes of different diameters and is adjustable in the direction of the axis of the pipe to make the cut at the desired distance from the end of the pipe and is preferably angularly adjustable to give different bevels. In the construction shown, the bar 62 at its upper end is welded or otherwise rigidly secured to a horizontal bar 66 which carries a sleeve 67 extending approximately radially of the table 20 and approximately in the plane of the latter. The sleeve 67 is preferably square or of other non-circular cross-section and clamped or otherwise secured to a bracket 68. The sleeve 67 encircles a screw shaft 69 held at its outer end against endwise movement in respect to the sleeve 67 and provided with a handle 70 at its outer end. The screw rod is threaded into the bar 66 so that as the handle is rotated, the sleeve 67 which carries the bracket 68 is moved in a radial direction in respect to the tube to be cut. The bracket 68 has a projection extending through the slot of the sleeve 67 and into engagement with the thread of the shaft 69 so that upon rotating the handle 70, the bracket 68 may be moved radially in respect to the table 20. The bracket 68 has a pair of arms 71 and 72 and the torch 60 is connected to the arm 71 by an adjustable clamp 73 and to the arm 72 by an adjustable clamp 74. The adjusting clamps 73 and 74 are illustrated of conventional types and may be loosened and the angle of the torch and the resulting bevel of the cut progressively changed by the operator swinging the torch during the cutting operation, so that the cut will have different bevels at different points along its length. Worm and worm wheel or screw and nut or other forms of clamping means may be employed, particularly where variations in the bevel are desirable and are to be made. With the torch of the kind illustrated and mounted in the position shown, the bevel will face in a general outward direction. By rotating the torch through 180° in its clamps, the tip 61 will be directed downwardly instead of upwardly and the bevel will face in a general inward direction. Obviously, the head of the torch may be such that the tip extends in the same general direction as the body of the torch or at any desired angle. By loosening the clamps, the torch may be swung about the pivotal center of the clamp 73 so as to vary the angle of the torch tip 61 to the pipe and during this angular movement, the clamp 74 may slide along the arm 72, which latter is pivoted to the bracket 68.

In order to adjust the bracket 68 vertically, the bar 62 is slidable on the bar 63 and a screw rod 75 is threaded into the inner bar 63 and held against endwise movement in respect to the outer bar or sleeve. Thus by turning the handle 76 on the upper end of the rod 75, the torch may be raised or lowered.

To prevent vibration during operation and to better insure the holding of the torch tip in the proper position for making the cut, a suitable guide is provided. This is shown as a bracket 77 mounted on the frame of the machine at one side of the table and engaging rollers on a bar 78 rigidly secured to and extending laterally from the tube 66 and bracket 68.

To remove slag or molten metal from the side of the wall being cut, any well known means may be employed such as an air nozzle or ejector carried by or within the pipes.

In adjusting the machine for operation, the proper cam 65 is secured in place depending upon the curvature to be cut, the handle 70 is rotated to the proper position determined by the diameter of the pipe to be cut, the handle 76 is rotated to bring the torch tip to the proper elevation above the table and determined by the distance between the cut and the end of the pipe, and the torch is fixed at the proper angle by the adjusting clamps 73 and 74. At the same time the speed of rotation of the table is set by the lever 47 and determined by the diameter of the pipe. To ease the operation and in part relieve the cam 65 of the load thereon caused by the weight of the bar 62 and the parts carried thereby, a counterbalancing weight 79 may be connected to the bracket 63 by a chain 80 extending over a pair of sprockets 81 and 82.

In normal cutting operations it is common to apply the torch at a point spaced a short distance from the line of the cut to be made and hold it in one place until a hole has been cut through the wall. The torch is then moved to cut the metal up to the desired line to be cut and then along that line. To facilitate such operation with the present machine, one of the sprockets, for instance, 82, is provided with a handle 83 which may be rotated to lift the roller 64 off the cam and to lift the torch tip to the desired distance above the cut to be made. The operator may hold the torch at this point until a hole is cut through the wall and prior to the engagement of the clutch 37. When the hole has been cut through, the operator may gradually turn the handle 83 to effect a downward cut until the roller 64 engages the cam 65 and the clutch is then engaged to start rotation of the pipe and the reciprocatory movement of the bar 62 and the torch carried thereby.

As previously noted, the rate of travel of the torch tip along the line of cut should be uniform, but where the line of cut around the pipe is of variable pitch, a uniform rate of rotation of the pipe will give too fast a travel of the tip along the line of cut which is at a steep pitch or too slow a rate of travel along a portion of the line of cut of little or no pitch. In order to maintain the rate of travel of the tip uniform along the line of cut, we have provided means for varying the rate of rotation of the pipe and in accordance with the pitch of the line of cut. In the particular means shown for accomplishing this result, the variable speed drive is adjusted during the operation of the machine.

Figure 4:
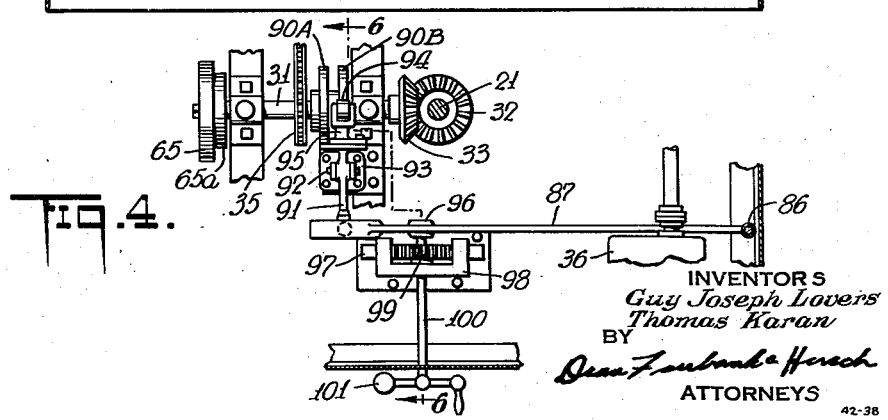
Fig. 4 is a horizontal section on the line 4—4 of Fig. 1.

As previously pointed out, the desired speed may be effected by swinging the frame 49 by means of the lever 47. To automatically vary the speed of rotation during the operation, the pivot 49' of the frame 49 is provided with a lever arm 85 connected by a link 86 to a lever 87 (see Fig. 1) and this lever is tilted about the pivot 88 (see Fig. 4) during the operation of the machine to alternately increase and decrease the speed of rotation of the shaft 34 and the parts driven thereby, namely, the shaft 31 and the cam 65. For effecting such movement of the lever 87, the shaft 31 is provided with a cam 90 which engages a lever 91 connected to one end of the lever 87. Relatively small variations in the pitch of the line to be cut may be taken care of by providing a large number of cams 90, but for practical purposes, two such cams 90A and 90B may be sufficient and they may be attached side by side on the shaft 31. It will be noted from Fig. 8 that the cam 90A has two diametrically opposite lobes and the cam 90B has four lobes. The cam 90A may be used in connection with the cam 65 of Fig. 10 when cutting the end of the pipe P, where said pipe is to be attached to the side of another pipe at right angles to the latter, and the cam 90B may be used in connection with the cam 65' for cutting the pipe P', where the pipe is to be attached to another pipe at an acute angle thereto, as shown in Fig. 10. To avoid the necessity for taking off a cam 90 and replacing it by another one for ordinary types of cuts, means are provided whereby the lever 91 may operate on either the cam 90A or cam 90B. As shown, the lever 91 is mounted on a pivot 92 on a bracket 93 and has a cam engaging roller 94. The portion of the lever 91 between the pivot 92 and the roller is made of two sections; the section 95 carrying the roller 94 being slidably connected to the remaining portion of the lever. The lever part 95 may be readily released and moved to proper position for engaging either the cam 90B or the cam 90A, without change in the pivotal mounting of the lever.

In order to give greater or lesser variation of the speed of rotation of the shaft 21 and the table, the relative effective lengths of the opposite end portions of the lever 87 may be made adjustable. For this purpose we provide means for adjusting the pivotal center of the lever 87 along the length of the lever. As shown, the lever is pivoted on a pin or stud 96 disposed in a slot in the lever 87, secured to a rack bar 97 movable in a bracket 98. This rack bar is normally stationary but engages a pinion 99 on a shaft 100 which may be rotated by a handle 101. By turning this handle, the pivot 96 of the lever 87 may be moved toward one or the other of the pivotal connections to the link 86 and the lever 91 to thereby increase or decrease the amount of speed variation effected during a single rotation of the table and the pipe carried thereby. The link 86 is preferably extensible in effective length, that is, it may have slidable and clampable connections to one or the other of the elements 85 and 87 or it may be made of two sections so that its length may be readily adjusted. In operation of the form shown, the adjusting screw 102 connecting the two sections of the link is released prior to an adjustment of the lever 47 in accordance with the diameter of the pipe to be cut. With the lever 47 in the proper position, and link 86 lengthened or shortened to the proper effective length, the screw 102 is tightened so that during the operation, the desired speed variation in accordance with the pitch of the line to be cut is effected by the particular cam 90 which is in operation. The locking pin 51 may be released or in some cases may be omitted entirely.

If it is desired to cut a series of nipples from a long pipe and with each nipple having one end cut off square and the other end cut on a curved line, the end of the pipe may be clamped by the grippers 22, and the torch may be used to make a cut in a single transverse plane at a distance from the table equal to the maximum length of the nipple and with the bar 62 clamped stationary or the cam removed. Then without removing the cut off end section from the grippers, a second cut is made just below the previous cut and of the desired curvature, using the proper cam 65. The nipple thus made may be removed and the pipe advanced endwise and again clamped to the table. Various other operations may be effected by the machine.

If it is desired to cut an aperture in a plate, or to cut a disc of any desired shape from a plate, the machine may be provided with the attachment shown in Fig. 13. The top of the frame may carry a bracket 110 in which is mounted a horizontally disposed shaft 111 provided with any suitable clamp 112 for securing in place a plate in a vertical plane and whereby it may be rotated by the shaft. For rotating the shaft 111 there may be provided sprocket and chain or other drive 113 from a shaft 114 having a gear 115 meshing with the gear 32 hereinbefore mentioned. With the sprockets of equal size, the shaft may be rotated at the same angular velocity as the shaft 21.

For cutting such a plate, the table 20 may be removed if necessary and the torch may be properly adjusted as to position. It is preferably one having a straight head instead of an angular one.

In Fig. 14 is shown a plate M having indicated thereon by dot and dash line, the line to be cut and which extends around a point 0 indicating the extension of the axis of the shaft 111. A cam 65 is used and is of such shape that as the plate M rotates about the axis 0, the torch tip 61 will raise and lower to follow the desired line of cut. Also the proper cam is used in place of the cam 90A or 90B to give the proper variation in rotational speed of the plate and the uniform travel of the line of cut past the torch tip.

Although a machine embodying our invention has been illustrated and described in some detail, it will be apparent that most, if not all, of the details of construction of this particular embodiment may be changed through a comparatively wide range and that mechanical equivalents may be employed in place of most, if not all, of the specific features selected for illustration and description in the foregoing specification.

Having thus described our invention, what we claim as new and desire to secure by Letters Patent is:

1. A pipe cutting machine of the type having a pipe rotating mechanism and a support for moving a torch back and forth lengthwise of the pipe during the rotation of the latter, said machine being characterized by the provision of means for varying the rate of rotational movement of the pipe during the rotation thereof in accordance with variations in pitch of the line to be cut to maintain the rate of cutting substantially constant.

2. A pipe cutting machine including means for rotating the pipe, said means including a variable speed drive, means for moving a cutting torch back and forth lengthwise of the pipe during the rotation of the latter, and means for varying the driving ratio of said variable speed drive during the rotation of the pipe.

3. A pipe cutting machine including a pipe support, a prime mover, a variable speed drive between said prime mover and said support, a cutting torch support and a pair of cams connected for simultaneous rotation; one acting to reciprocate said torch support and the other for varying the driving ratio of said variable speed drive.

4. A pipe cutting machine having a pipe support, a prime mover, a variable speed drive between said prime mover and said support, a cutting torch support, means for effecting relative movement of the torch support and pipe support in the direction of the axis of the latter, and means for varying the driving ratio of said variable speed drive to maintain the rate of travel of the torch along the cutting line substantially constant irrespective of the pitch of said cutting line.

5. A pipe cutting machine having a pipe support, means for moving a torch back and forth in the direction of the length of the pipe, and means for varying the speed of rotation of the pipe support during its rotation in accordance with variations in the pitch of the line to be cut.

6. A pipe cutting machine having a pipe support rotatable about a vertical axis, a vertically movable torch support, a cam rotatable at the same angular velocity as the pipe support, and acting on said torch support for effecting movement of the latter up and down in the direction of the length of the pipe, and a counterbalancing weight for supporting in part the weight of said torch support.

7. A pipe cutting machine having a rotatable pipe support, a torch support, a cam rotatable at the same angular velocity as the pipe support, and acting on said torch support for effecting movement of the latter back and forth in the direction of the length of the pipe, and means for holding said torch support out of engagement with said cam during the initial cutting operation.

8. A pipe cutting machine having a rotatable pipe support, a torch support, a cam for effecting relative back and forth movement of one of said supports in respect to the other, and a second cam for progressively varying the rate of rotation of said pipe support.

9. A pipe cutting machine including a rotatable pipe support, a torch support, means for effecting relative back and forth movement of one of said supports in respect to the other and in the direction of the axis of the pipe, a variable speed drive for said pipe support, means for varying the driving ratio of said variable speed drive during the rotation of said pipe support and in accordance with variations in the speed of movement effected by said first mentioned means.

10. A pipe cutting machine including a pipe support, a torch support, means for effecting relative back and forth movement of one of said supports in respect to the other and in the direction of the length of the pipe to be cut, and means for rotating one of said supports about the axis of the pipe to be cut and at a variable rate of speed dependent upon variations in the speed of movement effected by said first mentioned means, whereby the rate of travel of the torch along the line of cut is maintained substantially constant irrespective of variations in the pitch of the line of cut.

11. A torch cutting machine having a rotatable pipe support, a reciprocatory torch support, a variable speed drive for said pipe support, a pair of cams rotatable with said pipe support, and means adapted for operable engagement with either of said cams for progressively varying the driving ratio of said variable speed drive.

12. A pipe cutting machine having a rotatable pipe support, a reciprocatory torch support, means for adjusting the torch support radially in respect to the pipe in accordance with the size of the pipe to be cut, and means for varying the rate of rotation of the pipe support in accordance with the size of the pipe to be cut.

13. A torch cutting machine including a rotatable pipe support, a prime mover, driving connections between said prime mover and said pipe support and including a variable speed drive and a shaft, a cam on said shaft, and means actuated by said cam for varying the driving ratio of said variable speed drive.

14. A torch cutting machine including a pipe support, a variable speed drive for rotating said support, a lever arm for adjusting the driving ratio of said variable speed drive, and means rotatable with said support for actuating said lever.

15. A torch cutting machine including a pipe support, a variable speed drive for rotating said support, a lever arm for adjusting the driving ratio of said variable speed drive, and a cam rotatable with said support for actuating said lever.

16. A pipe cutting machine including a pipe support, a torch support, means for effecting relative rotation of said supports about the axis of the pipe, means for effecting relative reciprocation of said supports in the direction of the axis of the pipe, a variable speed drive for said first mentioned means, and control means for effecting a uniform rate of travel of the torch along the line of cut, irrespective of variations in the pitch of said line.

17. A torch cutting machine having a cutting torch, means for rotating a plate in a plane at an angle to the direction of the cutting plane, means for moving said torch back and forth in a direction radial to the axis of rotation of said plate, and means for varying the angular velocity of said plate during its rotation.

GUY JOSEPH LOVERS.
THOMAS KARAN.